UNITED STATES PATENT OFFICE.

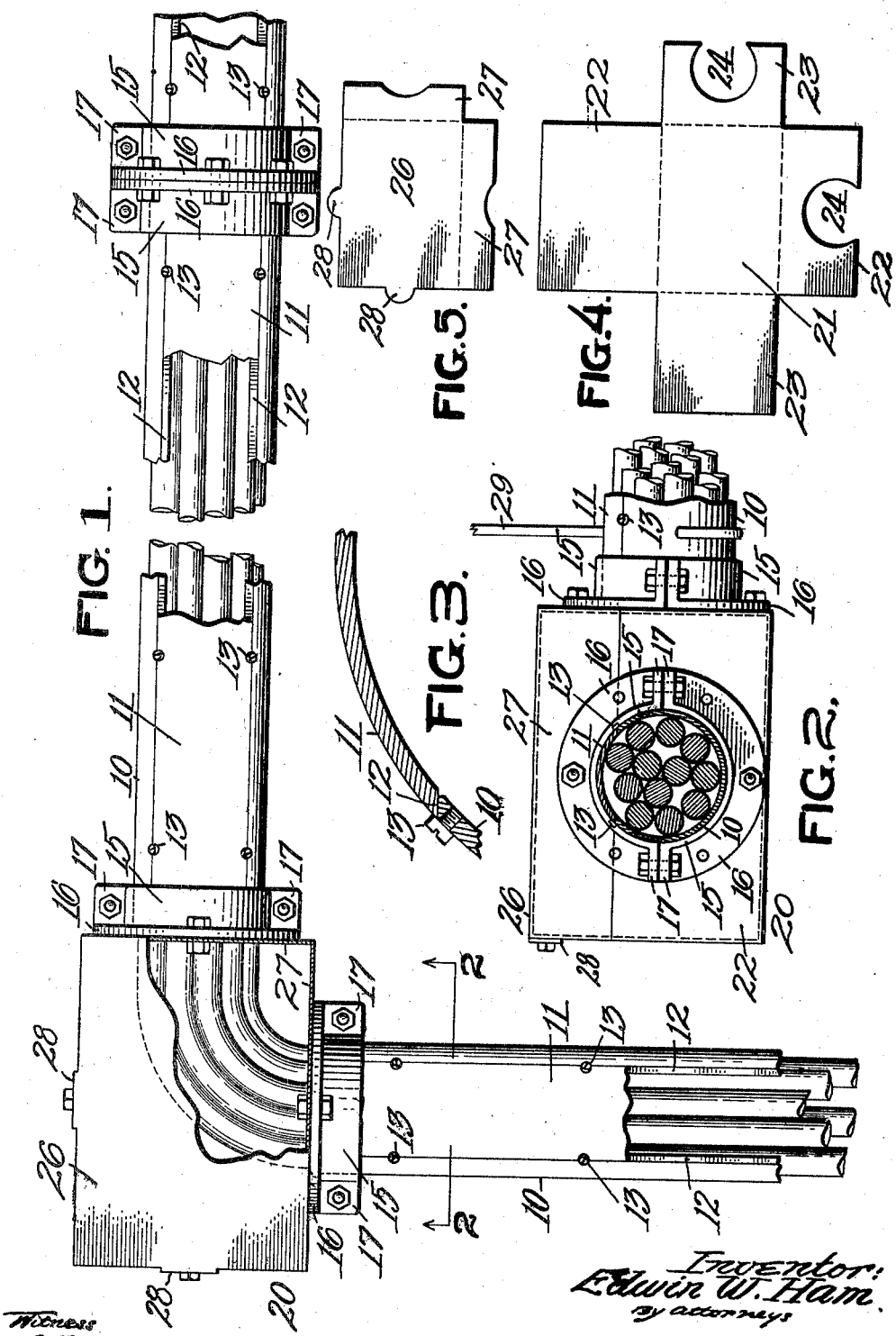

EDWIN W. HAM, OF WORCESTER, MASSACHUSETTS.

CABLE-CONDUIT.

1,315,550. Specification of Letters Patent. Patented Sept. 9, 1919.

Application filed January 21, 1918. Serial No. 212,915.

*To all whom it may concern:*

Be it known that I, EDWIN W. HAM, a citizen of the United States, residing at Worcester, in the county of Worcester and State of Massachusetts, have invented a new and useful Cable-Conduit, of which the following is a specification.

This invention relates to a conduit for cables for use in factories and similar places where a number of cables have to be supported and led around the plant.

The principal objects of the invention are to provide a construction that will avoid the present necessity of threading long cables through a closed conductor of the pipe form; to provide an arrangement by which the cables can be put in position and held without any material danger of wearing their insulating surfaces; to provide a construction which without increasing the external dimensions will be capable of receiving a very much larger number of cables than is now the case; and to provide improvements in the construction of the conduit itself as well as the means for holding the sections together and supporting them. Further objects and advantages of the invention will appear hereinafter.

Reference is to be had to the accompanying drawings in which—

Figure 1 is a plan of a system constructed in accordance with this invention:

Fig. 2 is a transverse sectional view of the same on the line 2—2 of Fig. 1;

Fig. 3 is a fragmentary section of part of the conduit on enlarged scale;

Fig. 4 is a plan of a corner box as cut out before the sides and ends are turned up, and Fig. 5 is a similar view of the cover therefor.

It is customary to lead cables around factories and the like in pipes which are connected together by means of flanges in a well known manner. This system although universally used is open to several objections. It is a long difficult job to thread the cables through a piece of piping. In doing this it is a difficult thing to avoid abrasion of the external surface of the insulating material on the cables, especially when they enter the end of the pipe and in passing around bends. It is practically impossible to thread a cable in one operation all the way through a long system of piping and pipes have to be taken down or at least disconnected at their ends in order to put in additional cables or to replace the cables taken out. It is of course impossible to entirely fill the cylindrical pipe with cables because of the difficulty of drawing them through when their opposite side surfaces contact with the inner surface of the pipe and the surface of an adjacent cable respectively. This invention is designed to overcome these difficulties in an exceedingly simple and inexpensive way, in fact to effect a material saving by using a much smaller conduit than would otherwise be required for any given number of cables.

Referring to the drawings it will be seen that the conduit for the cables is made up of a series of pipe sections 10 constructed like ordinary pipe sections except that a small portion, preferably less than semi-circular, at the top as indicated by the numeral 11 is cut off throughout the length of several sections of conduit. This is preferably cut off along a horizontal plane, if the conduit lies horizontally, although that is not absolutely essential. But that leaves a surface 12 on the top of each side of the pipe section 10 for supporting the cover 11 and it also leaves the metal projecting under the edge of the cover into which screws 13 can be inserted, the heads of which project over the joint and being located on opposite sides hold the cover firmly in position. This constitutes an extremely simple way of holding these covers. They are also held at the ends by a two-part flange member, each half being in the form of a semi-cylindrical element 15 with a semi-circular flange 16 integrally connected with it, the flanges being provided with diametrical webs 17 which are bolted together. These are preferably made a little less than semi-cylindrical so that upon fastening them together the bolts themselves will cause them to bind on the exterior surfaces of the pipe sections 10 and covers 11, both of which may be engaged and clamped in position. The flanges 16 are also provided with bolt holes so that two adjacent flanges can be bolted together to connect two sections of the conduit.

It will be understood that if desired the two members 10 and 11 can be formed or rolled from flat stock into the desired shape.

Where the conduit sections come together in such a manner as to change their direction so as to necessitate an angle fitting in ordinary piping the desired result is secured by means of rectangular corner boxes 20. These can be made up of sheet metal stamped out, each with a central portion 21 and four portions in the form of two sides 22 and two ends 23, and two of these parts can be perforated as at 24 to register with the ends of the conduits. When the conduits are inserted in this manner the end flanges 16 are bolted to the outer surface of the box around the openings 24. It will be understood, of course, that these openings may be in any of the parts of the box and in any location therein according to the particular relative position of the two conduits. The one shown constitutes a right angle or elbow, but of course, if other angles are required the same principles may be carried out to secure them. These openings 24 are extended up to the upper surface just under the cover.

It will be understood that the sixth side of the angle fitting is provided with a separate cover 26 preferably, and then when this is removed and the several covers 11 are removed also the conduit is left open throughout its length so that the cables can simply be laid in position. The cover is shown as having projections 27 for completing the sides or ends that are cut away and with fastening tabs 28.

It will be understood, of course, that the sections of the conduit are supported in the usual open wire or any desired way. For this purpose hooks 29 are shown.

It will be seen, therefore, that the disadvantages above mentioned are all overcome in this extremely simple way and none of the advantages of the old system are lost.

Although I have illustrated and described only a single form of the invention and have shown it in the form of a cylindrical conduit formed of piping, I am aware of the fact that modifications can be made therein by any person skilled in the art without departing from the scope of the invention as expressed in the claim. Therefore, I do not wish to be limited to all the details of construction herein shown and described, but what I do claim is:

A cable conduit system comprising a series of cylindrical sections arranged substantially in contact end to end throughout the length of the system, each section having a longitudinal opening on top throughout its length, said openings registering with each other lingitudinally so as to leave a continuous opening, whereby the cables can be placed in them from above through the continuous opening, longitudinal segmental cover plates resting on the edges of said sections, and fastening devices entering the section near the edges of the opening to hold the cover plates in position.

In testimony whereof I have hereunto affixed my signature.

EDWIN W. HAM.

Copies of this patent may be obtained for five cents each, by addressing the "Commissioner of Patents, Washington, D. C."